(12) United States Patent
Yabuuchi et al.

(10) Patent No.: US 11,188,781 B2
(45) Date of Patent: Nov. 30, 2021

(54) IMAGE ANALYZER, IMAGE ANALYSIS METHOD, AND IMAGE ANALYSIS PROGRAM

(71) Applicant: OMRON Corporation, Kyoto (JP)

(72) Inventors: Tomohiro Yabuuchi, Kyoto (JP); Tomoyoshi Aizawa, Kyoto (JP); Koichi Kinoshita, Kyoto (JP); Tadashi Hyuga, Hirakata (JP); Hatsumi Aoi, Kyotanabe (JP); Mei Uetani, Uji (JP)

(73) Assignee: OMRON Corporation, Kyoto (JP)

( * ) Notice: Subject to any disclaimer, the term of this patent is extended or adjusted under 35 U.S.C. 154(b) by 77 days.

(21) Appl. No.: 16/547,638

(22) Filed: Aug. 22, 2019

(65) Prior Publication Data

US 2019/0377967 A1    Dec. 12, 2019

Related U.S. Application Data

(63) Continuation of application No. PCT/JP2017/036280, filed on Oct. 5, 2017.

(30) Foreign Application Priority Data

Mar. 14, 2017 (JP) .............................. JP2017-048287

(51) Int. Cl.
*G06K 9/46* (2006.01)
*G06F 9/30* (2018.01)
*G06K 9/00* (2006.01)

(52) U.S. Cl.
CPC ......... *G06K 9/4638* (2013.01); *G06F 9/3005* (2013.01); *G06K 9/00268* (2013.01);
(Continued)

(58) Field of Classification Search
CPC ............. G06K 9/4638; G06K 9/00268; G06K 9/00295; G06K 9/00362; G06K 9/00624;
(Continued)

(56) References Cited

U.S. PATENT DOCUMENTS

2010/0183218 A1* 7/2010 Naito ................. G06K 9/00281
382/159
2010/0272363 A1* 10/2010 Steinberg ........... G06K 9/00288
382/190

(Continued)

FOREIGN PATENT DOCUMENTS

JP    2007-287024 A    11/2007
JP    2007287024 A  *  11/2007

(Continued)

OTHER PUBLICATIONS

English translation of the International Search Report("ISR") of PCT/JP2017/036280 dated Dec. 26, 2017.
Written Opinion("WO") of PCT/JP2017/036280 dated Dec. 26, 2017.

*Primary Examiner* — Edward F Urban
*Assistant Examiner* — Wassim Mahrouka
(74) *Attorney, Agent, or Firm* — Metrolex IP Law Group, PLLC

(57) ABSTRACT

An image analyzer repeatedly obtains a captured image including a subject to be detected, and detects, in the captured image, a first area likely to include the subject without a cover, detects, in the captured image, a second area likely to include the subject with a cover, and determines whether the subject is covered by the cover based on a detection result of the first area and a detection result of the second area and a determination result for the captured image obtained previously.

17 Claims, 6 Drawing Sheets

(52) U.S. Cl.
CPC ..... *G06K 9/00295* (2013.01); *G06K 9/00362* (2013.01); *G06K 9/00624* (2013.01)

(58) Field of Classification Search
CPC ............ G06K 9/00281; G06K 9/00771; G06F 9/3005; G06T 7/00
See application file for complete search history.

(56) References Cited

U.S. PATENT DOCUMENTS

| | | | |
|---|---|---|---|
| 2012/0288164 A1 | 11/2012 | Nagashima et al. | |
| 2013/0215319 A1* | 8/2013 | Tomita ............... | H04N 5/23212 348/345 |
| 2013/0243274 A1* | 9/2013 | Sukegawa .......... | G06K 9/00221 382/118 |
| 2015/0371397 A1* | 12/2015 | Wang ................... | G06K 9/4652 382/159 |
| 2018/0005510 A1* | 1/2018 | Okada .................... | G08B 21/22 |

FOREIGN PATENT DOCUMENTS

| | | | |
|---|---|---|---|
| JP | 2008-9849 A | | 1/2008 |
| JP | 2008-269182 A | | 11/2008 |
| JP | 2008269182 A | * | 11/2008 |
| JP | 2010-003117 A | | 1/2010 |
| JP | 2010-160640 A | | 7/2010 |
| JP | 2011-2882 A | | 1/2011 |
| JP | 2012-48675 A | | 3/2012 |
| JP | 2012-238057 A | | 12/2012 |
| JP | 2015-213537 A | | 12/2015 |
| JP | 2015213537 A | * | 12/2015 |
| JP | 2016-40705 A | | 3/2016 |

* cited by examiner

IMAGE ANALYZER, IMAGE ANALYSIS METHOD, AND IMAGE ANALYSIS PROGRAM

CROSS REFERENCE TO RELATED APPLICATIONS

This application is a continuation application of International Application No. PCT/JP2017/036280, filed on Oct. 5, 2017, which claims priority based on the Article 8 of Patent Cooperation Treaty from prior Japanese Patent Application No. 2017-048287, filed on Mar. 14, 2017, the entire contents of all of which are incorporated herein by reference.

FIELD

The present disclosure relates to an image analyzer, an image analysis method, and an image analysis program.

BACKGROUND

An image processing technique such as template matching can be used to detect an intended subject from a captured image. However, a subject with a cover may be undetectable from a captured image with such an image processing technique. For example, a human face wearing a mask may be undetectable from a captured image.

In response to this, Patent Literature 1 describes a technique using a machine learning system that is trained to respond to images of a subject wearing a mask, and a machine learning system trained to respond to images of a subject wearing no mask. The technique described in Patent Literature 1 uses such separate machine learning systems, one dedicated to the state of a subject wearing a mask and the other to the state of a subject wearing no mask to perform image analyses appropriate for such different states.

CITATION LIST

Patent Literature

Patent Literature 1: Japanese Unexamined Patent Application Publication No. 2010-003117

SUMMARY

Technical Problem

The inventors have noticed issues associated with the above image processing technique. Each machine learning system cannot be trained for all face patterns of a person, and thus may erroneously detect a subject. This can be a barrier to improving the accuracy of determining whether a subject is covered by a cover, such as a mask.

In response to the above issue, one or more aspects are directed to a technique for increasing the accuracy of determining whether a subject is covered by a cover.

Solution to Problem

One or more aspects may have the structure described below.

An image analyzer according to one or more aspects includes an image obtaining unit that repeatedly obtains a captured image including a subject to be detected, a first detector that detects, in the captured image, a first area likely to include the subject without a cover, a second detector that detects, in the captured image, a second area likely to include the subject with a cover, a determination unit that determines whether the subject in the captured image is covered by the cover, and an area locating unit that selects one of a detection result from the first detector and a detection result from the second detector in accordance with a determination result from the determination unit, and locates a subject area including the subject in the captured image based on the selected detection result. The determination unit determines whether the subject is covered by the cover based on the detection result from the first detector and the detection result from the second detector, and a determination result as to whether the subject in a captured image obtained previously is covered by the cover.

The image analyzer with the above structure determines whether a subject is covered by a cover based on the determination result for the captured image obtained previously in addition to the detection result from the first detector for detecting a subject without a cover and the detection result from the second detector for detecting a subject with a cover. The image analyzer can thus evaluate the reliability of the detection results from the detectors based on past determination results. The image analyzer can also determine whether a subject is covered by a cover based on past determination results when such determination is difficult with detection results from the two detectors. The above structure can thus improve the accuracy of determining whether a subject is covered by a cover.

The image analyzer according to one or more aspects may further include a coarse detector that searches the captured image at intervals larger than intervals at which the first detector searches for the first area and intervals at which the second detector searches for the second area, and detects a coarse candidate area likely to include the subject. The first detector may detect the first area in a neighboring range including and around the coarse candidate area detected by the coarse detector, and the second detector may detect the second area in a neighboring range including and around the coarse candidate area detected by the coarse detector. The image analyzer with the above structure can reduce the frequency of searching for the subject. The image analyzer can thus reduce the computational complexity in the image analysis, thus reducing the computational load on the processor.

In the image analyzer according to one or more aspects, the coarse detector may detect the coarse candidate area in a neighboring range including and around the subject area located in a captured image obtained previously. The image analyzer with the above structure can narrow the range of searching for a subject to the area determined to have high likelihood of including the subject. The image analyzer can thus reduce the computational complexity in the image analysis without greatly degrading the accuracy in subject detection, thus reducing the computational load on the processor.

In the image analyzer according to one or more aspects, the determination unit may determine that the subject is not covered by the cover when the first detector detects more first areas than second areas detected by the second detector by a difference in number between the first areas and the second areas satisfying a predetermined condition, the determination unit may determine that the subject is covered by the cover when the second detector detects more second areas than first areas detected by the first detector by a difference in number between the first areas and the second areas satisfying a predetermined condition, and the determination unit may determine whether the subject is covered by the cover based on a determination result as to whether the subject in a captured image obtained previously is covered by the cover when the difference in number between first areas detected by the first detector and second areas detected by the second detector does not satisfy the predetermined condition. When the difference in number between the areas detected by the first and second detectors is insignificant, the image analyzer with the above structure uses past determination results to improve the accuracy of determining whether a subject is covered by a cover.

In the image analyzer according to one or more aspects, when the first detector detects a plurality of first areas and when the determination unit determines that the subject is not covered by the cover, the area locating unit may locate the subject area including the subject by joining the plurality of first areas, and when the second detector detects a plurality of second areas and when the determination unit determines that the subject is covered by the cover, the area locating unit may locate the subject area including the subject by joining the plurality of second areas. The image analyzer with the above structure uses all detection results from the detectors to locate the area including the subject.

In the image analyzer according to one or more aspects, in response to a difference in number between first areas detected by the first detector and second areas detected by the second detector not satisfying a predetermined condition, the determination unit may detect a difficulty in determining whether the subject is covered by the cover when the subject in a captured image obtained previously is determined to be covered by the cover and more first areas than the second areas are detected or when the subject in the captured image obtained previously is determined not to be covered by the cover and more second areas than the first areas are detected, and when the determination unit detects a difficulty in determining whether the subject is covered by the cover, the area locating unit may locate the subject area including the subject by joining the first areas detected by the first detector and the second areas detected by the second detector. The image analyzer with the above structure joins the detection results from the two detectors to locate the area determined to have high likelihood of including a subject when having difficulties in determining whether the subject is covered by the cover based on the detection results from the two detectors and the past determination results.

The image analyzer according to one or more aspects may further include an error determination unit that redetects the subject in the located subject area to determine whether the located subject area has been detected erroneously. The image analyzer with the above structure avoids erroneous detection of a subject area, and improves the reliability of processing for detecting a subject in a captured image.

In the image analyzer according to one or more aspects, the subject to be detected may be a human face. The cover may be a mask. The image analyzer with the above structure can determine whether the face is covered by a mask.

Another form of the image analyzer with the features described above may be an image processing method for implementing the above features, an image processing program, or a storage medium storing the program readable by a computer, or another device or machine. The computer-readable recording medium includes a medium storing a program or other information in an electrical, magnetic, optical, mechanical, or chemical manner.

For example, an image analysis method according to one or more aspects is implemented by a computer. The method includes repeatedly obtaining a captured image including a subject to be detected, detecting, in the captured image, a first area likely to include the subject without a cover, detecting, in the captured image, a second area likely to include the subject with a cover, determining whether the subject in the captured image is covered by the cover, and selecting one of a detection result obtained in detecting the first area and a detection result obtained in detecting the second area in accordance with a determination result obtained in determining whether the subject is covered, and locating a subject area including the subject in the captured image based on the selected detection result. Determining whether the subject is covered by the cover includes determining whether the subject is covered by the cover based on the detection result obtained in detecting the first area and the detection result obtained in detecting the second area, and a determination result as to whether the subject in a captured image obtained previously is covered by the cover.

For example, an image analysis program according to one or more aspects causes a computer to implement repeatedly obtaining a captured image including a subject to be detected, detecting a first area likely to include the subject without a cover in the captured image, detecting a second area likely to include the subject with a cover in the captured image, determining whether the subject in the captured image is covered by the cover, and selecting one of a detection result obtained in detecting the first area and a detection result obtained in detecting the second area in accordance with a determination result obtained in determining whether the subject is covered, and locating a subject area including the subject in the captured image based on the selected detection result. Determining whether the subject is covered by the cover includes determining whether the subject is covered by the cover based on the detection result obtained in detecting the first area and the detection result obtained in detecting the second area, and a determination result as to whether the subject in a captured image obtained previously is covered by the cover.

Advantageous Effects

The technique according to one or more aspects improves the accuracy of determining whether a subject is covered by a cover.

DETAILED DESCRIPTION

An embodiment (or, one or more embodiments) will now be described with reference to the drawings. One or more embodiments described below are a mere example in any aspect, and may be variously modified or altered without departing from the scope of the present invention. More specifically, any configuration specific to an embodiment may be used as appropriate to implement one or more embodiments. Although data used in one or more embodiments is described in a natural language, such data may be specifically defined using any computer-readable language, such as a pseudo language, commands, parameters, or a machine language.

1. Example Use

Figure 1:
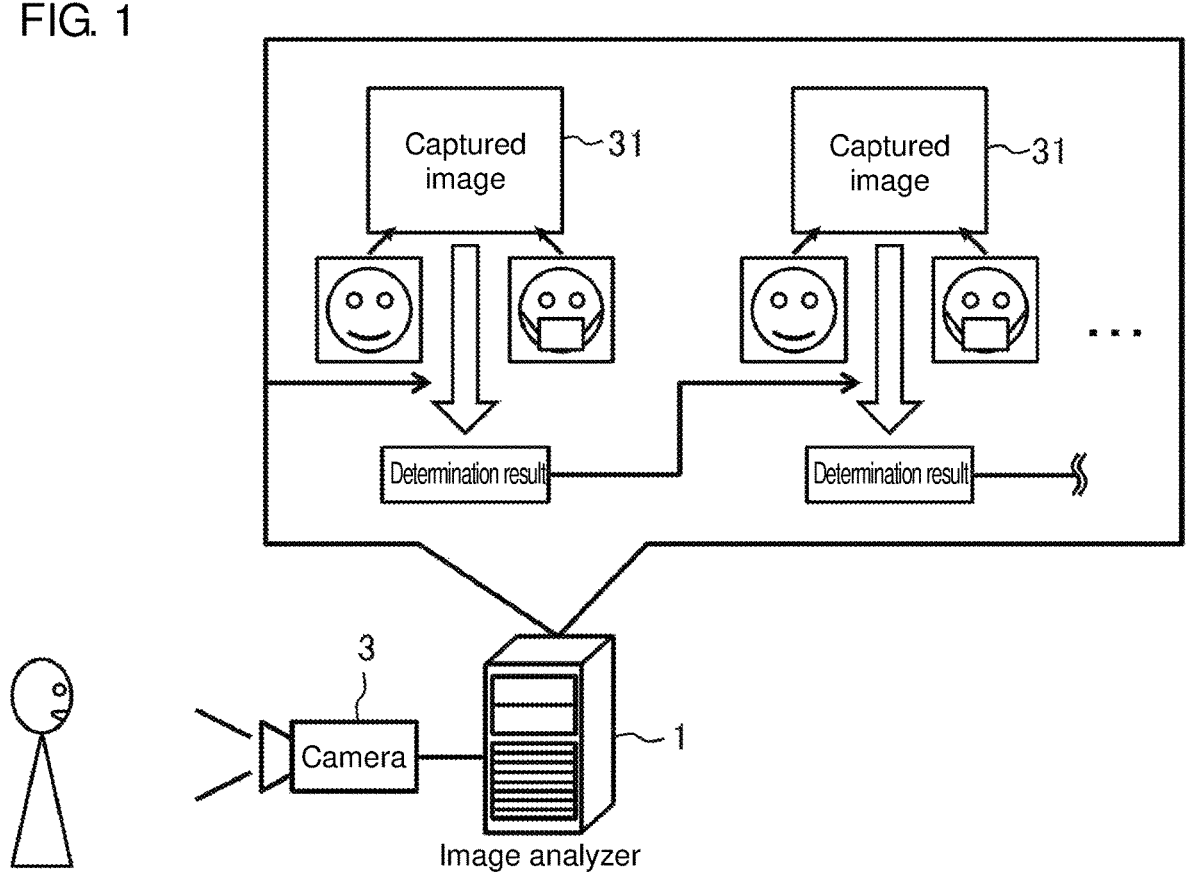
FIG. 1 is a schematic diagram illustrating an example of an image analyzer according to one or more embodiments used in one situation.

One example use of an image analyzer according to one or more embodiments will now be described with reference to FIG. 1. FIG. 1 is a schematic diagram of an image analyzer 1 according to one or more embodiments used in one situation.

As shown in FIG. 1, the image analyzer 1 according to one or more embodiments is a computer that extracts an area including a human face (hereafter, a face area) from a captured image 31 of a person captured by a camera 3. The human face is an example of a subject to be detected in one or more embodiments.

More specifically, the image analyzer 1 repeatedly obtains captured images 31 each including a human face from the camera 3. The person in each captured image 31 may wear a mask on his or her face. More specifically, the human face in each captured image 31 may be covered by a mask. A mask wearable by a person is an example of a cover in one or more embodiments. An area including a human face in a captured image 31 of a person wearing a mask on his or her face may largely differ from an area including a human face in a captured image 31 of a person wearing no mask.

The image analyzer 1 according to one or more embodiments obtains a captured image 31 and detects a first area likely to include a face without a mask in the captured image 31. The image analyzer 1 also detects a second area likely to include a face with a mask in the captured image 31. The image analyzer 1 obtaining a captured image 31 determines whether a human face is covered by a mask, that is, a person wears a mask on his or her face in the captured image 31.

The image analyzer 1 according to one or more embodiments repeatedly obtains captured images 31, and detects the first area or the second area in each image, and determines whether a person wears a mask on his or her face in each image. Through the above processing performed repeatedly, the image analyzer 1 can accumulate past results of determination as to whether the person wears a mask on his or her face. Using these past determination results, the image analyzer 1 determines whether the person in the captured image 31 obtained in the current process wears a mask on his or her face.

More specifically, the image analyzer 1 determines whether the person in the captured image 31 obtained in the current process wears a mask on his or her face based on the detection results for the first and second areas, and the results of determination as to whether the person in a captured image 31 previously obtained wears a mask on his or her face. Using the determination results, the image analyzer 1 selects one of the detection results for the first and second areas, and locates the face area including the human face based on the selected detection result. This face area corresponds to a subject area in one or more embodiments.

As described above, the image analyzer 1 according to one or more embodiments determines whether the person in the captured images 31 obtained in the current process wears a mask on his or her face based on determination results for previously obtained captured images 31 in addition to the detection results for a face with a mask and a face without a mask. Thus, the image analyzer 1 can evaluate the reliability of the detection results for faces in such different face states based on the past determination results. The image analyzer 1 can also determine whether a person wears a mask on his or her face based on past determination results when such determination is difficult with detection results for the two face states. Thus, the structure according to one or more embodiments can improve the accuracy of determining whether a person wears a mask on his or her face.

2. Configuration

Hardware Configuration

Figure 2:
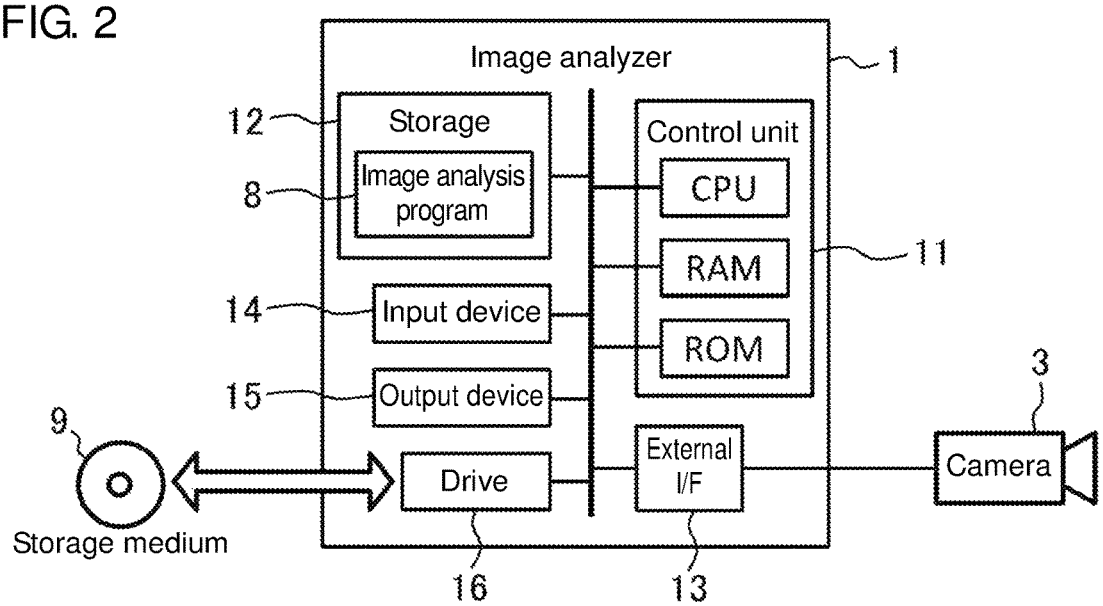
FIG. 2 is a schematic diagram illustrating a hardware configuration of an image analyzer according to one or more embodiments.

The hardware configuration of the image analyzer 1 according to one or more embodiments will now be described with reference to FIG. 2. FIG. 2 is a schematic diagram of the image analyzer 1 according to one or more embodiments showing its hardware configuration.

As shown in FIG. 2, the image analyzer 1 according to one or more embodiments is a computer including a control unit 11, a storage 12, an external interface 13, an input device 14, an output device 15, and a drive 16 that are electrically connected to one another. In FIG. 2, the external interface is abbreviated as an external I/F.

The control unit 11 includes, for example, a central processing unit (CPU) as a hardware processor, a random access memory (RAM), and a read only memory (ROM). The control unit 11 controls each unit in accordance with intended information processing. The storage 12 includes, for example, a hard disk drive and a solid state drive, and stores an image analysis program 8, data used by the control unit 11, and other information. The storage 12 corresponds to a memory. The image analysis program 8 is executed by the image analyzer 1 to implement information processing for extracting a human face (FIG. 4) described later. This will be described in detail later.

The external interface 13 for connection with external devices is designed as appropriate depending on the external devices to be connected. In one or more embodiments, the image analyzer 1 is connected to the camera 3 through the external interface 13. The camera 3 may be installed as appropriate depending on an embodiment. For example, the camera 3 may be installed to capture images of a driver driving a vehicle seated in the driver seat to detect the driver's face with the image analyzer 1. The camera 3 may be installed to capture images of the street to detect the faces of pedestrians walking on the street with the image analyzer 1. The camera 3 may be installed to capture images of workers at a factory to detect the faces of the factory workers with the image analyzer 1. The camera 3 may be connected to the image analyzer 1 with a network.

The input device 14 is, for example, a mouse and a keyboard. The output device 15 is, for example, a display and a speaker. An operator may operate the image analyzer 1 through the input device 14 and the output device 15.

The drive 16 includes, for example, a compact disc (CD) drive and a digital versatile disc (DVD) drive for reading a program stored in a storage medium 9. The type of drive 16 may be selected as appropriate depending on the type of storage medium 9. The image analysis program 8 may be stored in the storage medium 9.

The storage medium 9 stores programs or other information in an electrical, magnetic, optical, mechanical, or chemical manner to allow a computer or another device or machine to read the recorded programs or other information. The image analyzer 1 may obtain the image analysis program 8 from the storage medium 9.

In FIG. 2, the storage medium 9 is a disc-type storage medium, such as a CD or a DVD. However, the storage medium 9 is not limited to a disc. One example of the storage medium other than a disc is a semiconductor memory such as a flash memory.

For the specific hardware configuration of the image analyzer 1, components may be eliminated, substituted, or added as appropriate depending on an embodiment. For example, the control unit 11 may include multiple hardware processors. The hardware processors may be a microprocessor, a field-programmable gate array (FPGA), and other processors. The image analyzer 1 may include a communication module for data communication with other devices with a network. The image analyzer 1 may include multiple information processing apparatuses. The image analyzer 1 may also be an information processing apparatus dedicated to an intended service, or may be a general-purpose desktop personal computer (PC) or a tablet PC.

Functional Components

Figure 3:
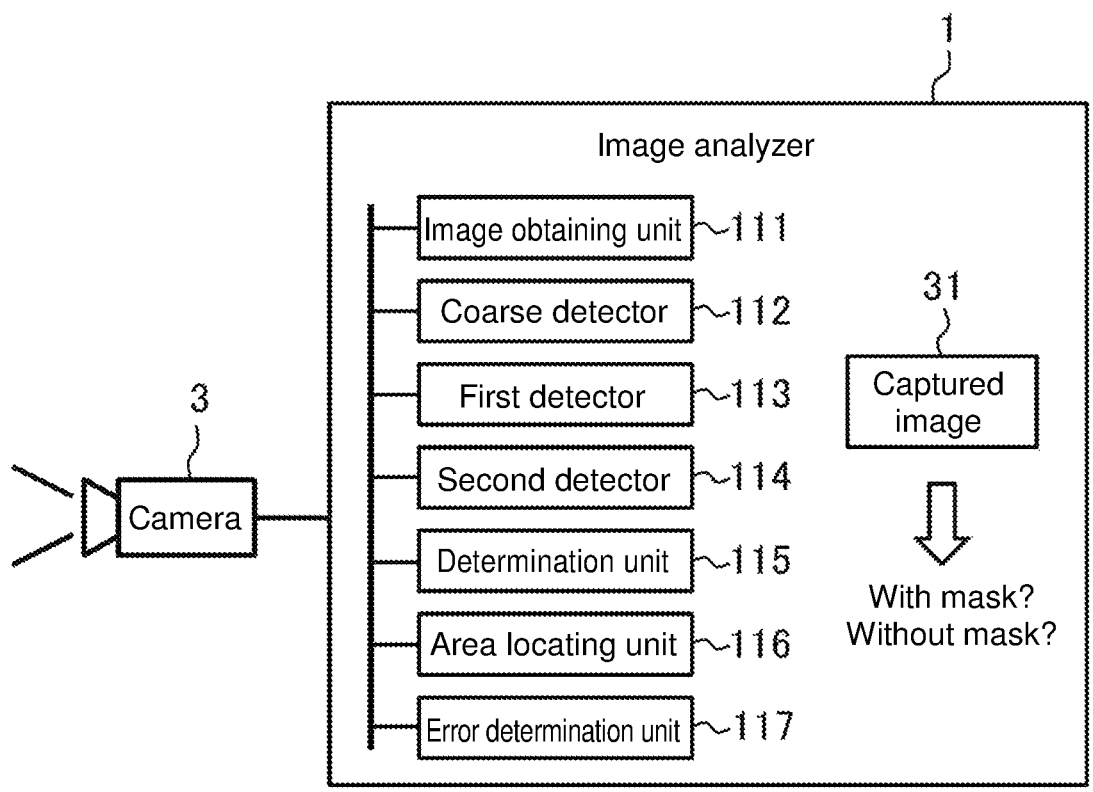
FIG. 3 is a schematic diagram illustrating functional components of an image analyzer according to one or more embodiments.

Example functional components included in the image analyzer 1 according to one or more embodiments will now be described with reference to FIG. 3. FIG. 3 is a schematic diagram of the image analyzer 1 according to one or more embodiments showing its functional components.

The control unit 11 included in the image analyzer 1 loads the image analysis program 8 stored in the storage 12 into the RAM. The CPU in the control unit 11 then interprets and executes the image analysis program 8 loaded in the RAM to control each unit. The image analyzer 1 according to one or more embodiments thus functions as a computer including an image obtaining unit 111, a coarse detector 112, a first detector 113, a second detector 114, a determination unit 115, an area locating unit 116, and an error determination unit 117 as shown in FIG. 3.

The image obtaining unit 111 repeatedly obtains captured images 31 each including a human face from the camera 3. The coarse detector 112 searches each obtained captured image 31 for an area including a human face irrespective of whether wearing a mask at intervals larger than search intervals at which searching is performed by the first and second detectors 113 and 114 (described later). The coarse detector 112 detects a coarse candidate area likely to include a human face in each obtained captured image 31.

The first detector 113 searches a range including and around a coarse candidate area detected in an obtained captured image 31 for an area including a face without a mask at intervals smaller than the intervals at which searching is performed by the coarse detector 112. The first detector 113 detects a first area likely to include a face without a mask in the obtained captured image 31. The second detector 114 searches a range including and around the coarse candidate area detected in the obtained captured image 31 for an area including a face with a mask at intervals smaller than the intervals at which searching is performed by the coarse detector 112. The second detector 114 detects a second area likely to include a face with a mask in the obtained captured image 31.

The determination unit 115 determines whether a person wears a mask on his or her face in the obtained captured image 31. More specifically, in repeatedly extracting faces, the determination unit 115 determines whether a person in a captured image 31 obtained in the current process wears a mask on his or her face based on detection results from the first and second detectors 113 and 114, and results of determination as to whether the person in a previously obtained captured image 31 wears a mask on his or her face.

Using the determination results from the determination unit 115, the area locating unit 116 selects one of the detection results for the first and second areas from the first and second detectors 113 and 114, and locates the face area including a human face based on the selected detection result. An error determination unit 117 redetects a human face in the located face area to determine whether the located face area has been detected erroneously.

The functions of the image analyzer 1 will be described in detail in the operation examples described below. In one or more embodiments, each function of the image analyzer 1 is implemented by a general-purpose CPU. However, some or all of the functions may be implemented by one or more dedicated processors. For the functional components of the image analyzer 1, components may be eliminated, substituted, or added as appropriate depending on an embodiment.

3. Operation Examples

Figure 4:
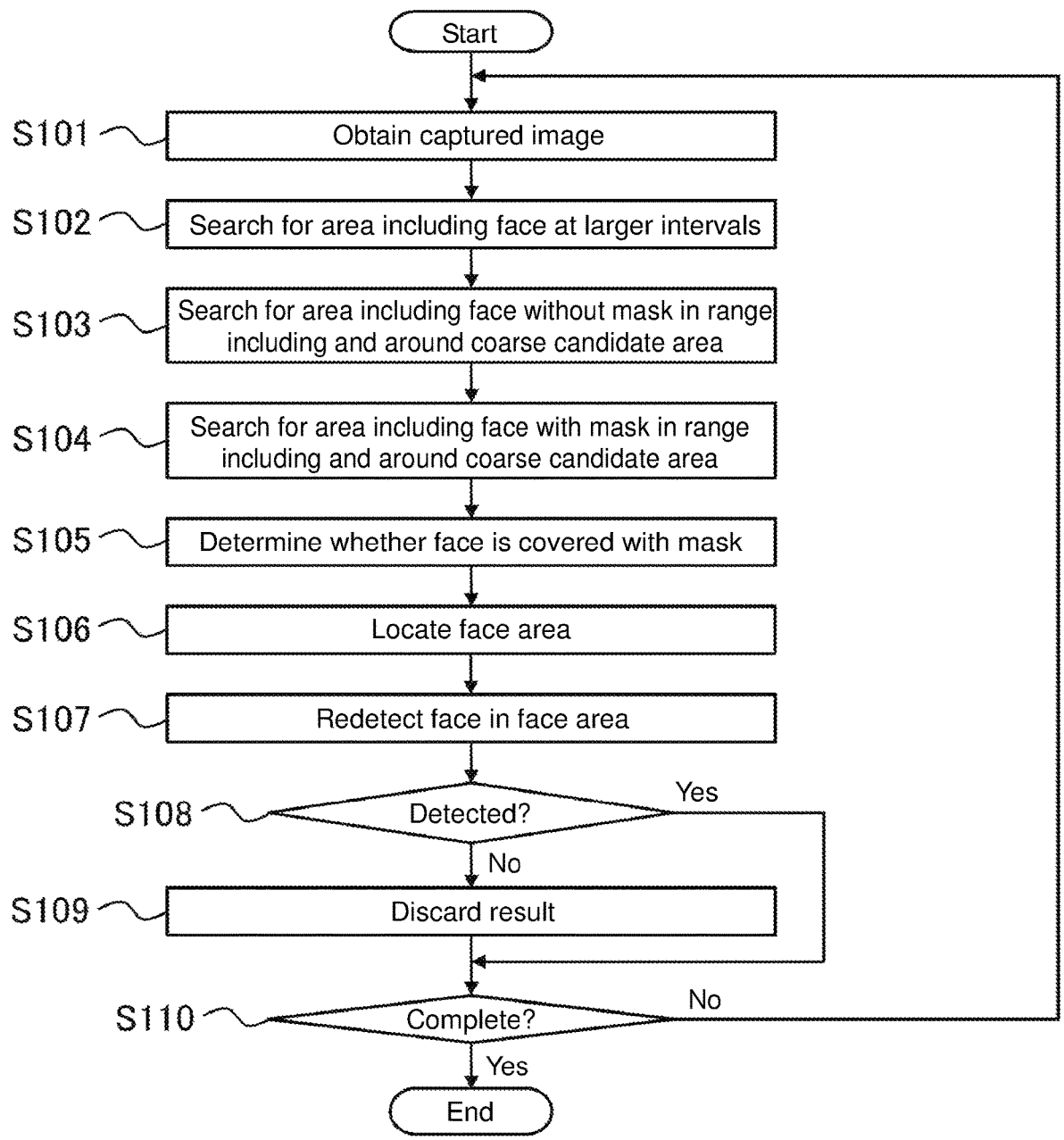
FIG. 4 is a flow diagram illustrating a procedure performed by an image analyzer according to one or more embodiments.

Operation examples of the image analyzer 1 will now be described with reference to FIG. 4. FIG. 4 is a flowchart of a procedure performed by the image analyzer 1. The procedure for extracting a face area including a human face described below corresponds to an image analysis method of one or more embodiments. However, the procedure described below is a mere example, and each of its processes may be modified in any possible manner. In the procedure described below, steps may be eliminated, substituted, or added as appropriate depending on an embodiment.

Step S101

In step S101, the control unit 11 functions as the image obtaining unit 111 and obtains a captured image 31 including a human face from the camera 3. After obtaining the captured image 31, the control unit 11 advances the processing to step S102. The captured image 31 may be a moving image or multiple still images. For convenience of explanation, the control unit 11 advances the processing to step S102 after obtaining one frame of a moving image or one still image. The processing in step S101 is not limited to the above example. The control unit 11 may obtain a moving image including multiple frames or multiple still images with the processing in step S101.

Step S102

In step S102, the control unit 11 functions as the coarse detector 112 and coarsely searches the captured image 31 obtained in step S101 for an area including a human face. More specifically, the control unit 11 searches the obtained captured image 31 for an area including a human face at intervals larger than the intervals at which searching is performed for the first and second areas in steps S103 and S104 (described later). The control unit 11 detects a coarse candidate area likely to include a human face in the obtained captured image 31.

Figure 5:
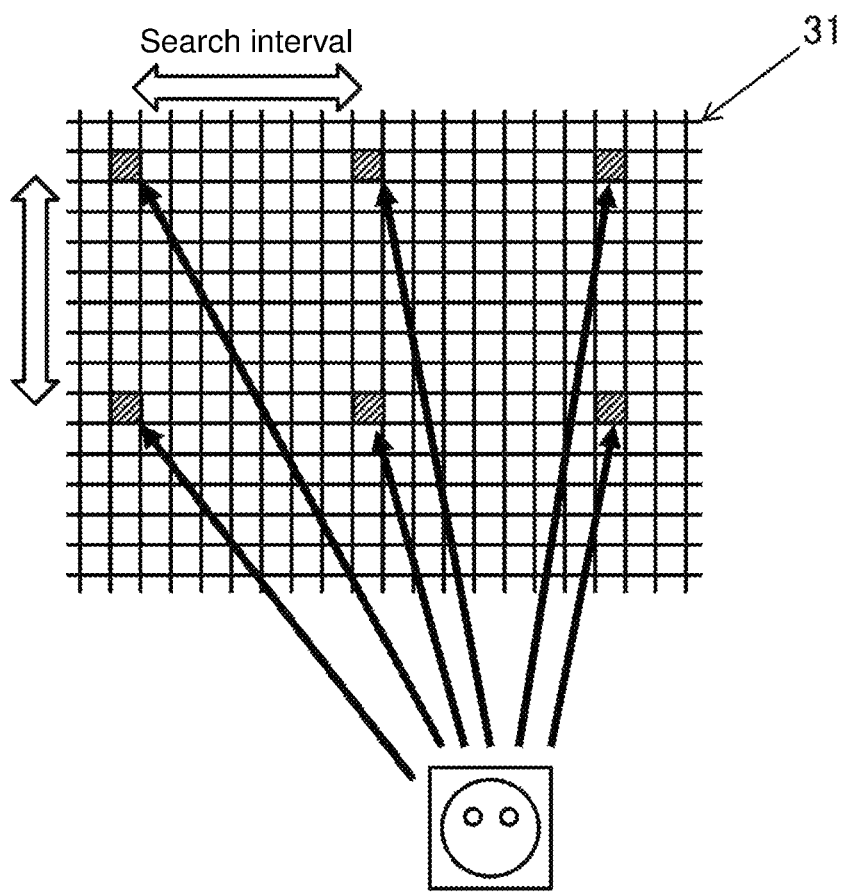
FIG. 5 is a schematic diagram illustrating an image analyzer according to one or more embodiments used for coarse searching for a face area.

The processing in step S102 will now be described in detail with reference to FIG. 5. FIG. 5 is a schematic diagram of the processing in step S102. As shown in FIG. 5, the control unit 11 searches the obtained captured image 31 for an area including a human face at intervals of, for example, predetermined pixels (eight pixels in the example of FIG. 5). The search intervals may be determined as appropriate depending on an embodiment.

A coarse candidate area likely to include a human face may be detected with any method selected as appropriate depending on an embodiment. For example, to detect a coarse candidate area likely to include a human face, a known image processing method such as template matching may be performed, or a discriminator constructed by machine learning, such as a neural network or a self-organizing map, may be used. A method for detecting a coarse candidate area with template matching will be described below.

FIG. 5 shows an example method for detecting a coarse candidate area likely to include a human face with template matching. The hatched pixels in FIG. 5 each indicate the position at which the upper left corner of a template is to be aligned. In other words, the control unit 11 compares (or checks) an area in a predetermined range in the captured image 31 with (or against) the template at predetermined search intervals, starting from a reference position in the captured image 31. Thus, the control unit 11 detects an area that matches the template with accuracy of greater than or equal to a predetermined threshold as a coarse candidate area likely to include a human face. The template used in step S102 is face image data that serves as a reference in comparison with a target image (captured image 31) to determine whether the image includes a face irrespective of whether wearing a mask.

As described above, the method for detecting a coarse candidate area is not limited to the above example, and may be selected as appropriate depending on an embodiment. For example, the method may use a neural network trained to output information about the position and the dimensions of a coarse candidate area in an obtained captured image in response to an input of the captured image. The control unit 11 can obtain information about the position and the dimensions of a coarse candidate area after inputting the captured image 31 to the trained neural network and performing computation for determining firing in the forward direction from the input layer.

In step S102, the control unit 11 detects a coarse candidate area with low accuracy to enable detection of such a coarse candidate area likely to include a face either with or without a mask. Thus, the control unit 11 can detect a coarse candidate area likely to include a face with or without a mask. After the detection of the coarse candidate area is complete, the control unit 11 advances the processing to step S103.

Steps S103 and S104

Referring back to FIG. 4, in step S103, the control unit 11 functions as the first detector 113 and detects a first area likely to include a face without a mask in the obtained captured image 31. In one or more embodiments, the control unit 11 coarsely detects an area including a human face in step S102. In step 103, the control unit 11 searches a range including and around the coarse candidate area detected in the captured image 31 for an area including a face without a mask at intervals smaller than the intervals at which searching is performed in step S102. Thus, the control unit 11 detects a first area likely to include a face without a mask in the captured image 31.

In step S104, the control unit 11 functions as the second detector 114 and detects a second area likely to include a face with a mask in the obtained captured image 31. More specifically, as in step S103, the control unit 11 searches a range including and around the coarse candidate area detected in the captured image 31 for an area including a face with a mask at intervals smaller than the intervals at which searching is performed in step S102. Thus, the control unit 11 detects a second area likely to include a face with a mask in the captured image 31.

Figure 6:
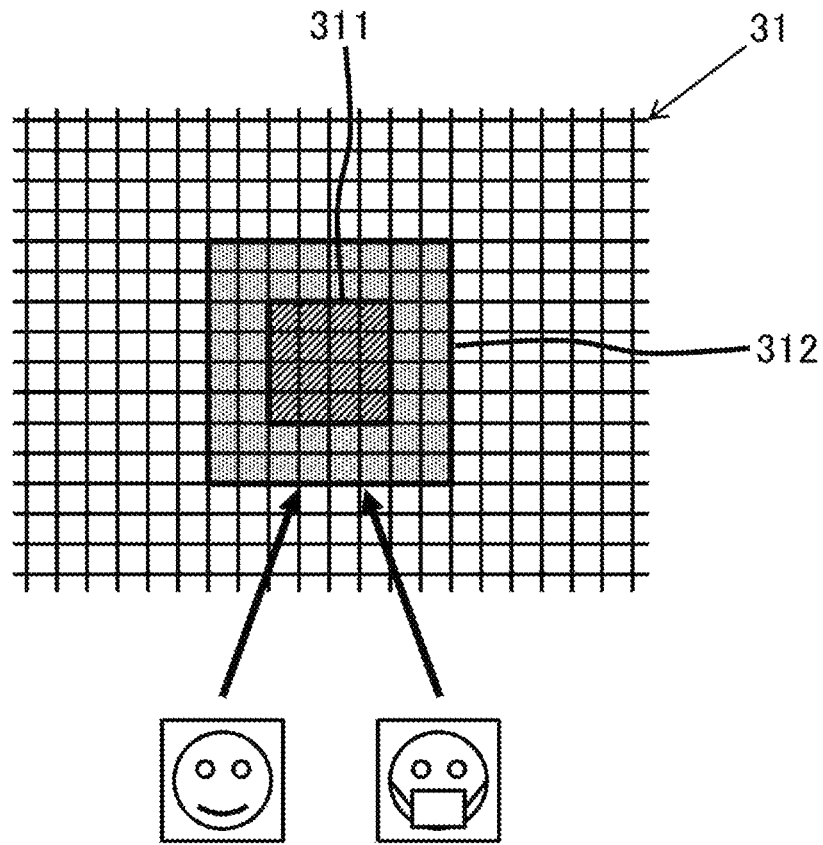
FIG. 6 is a schematic diagram illustrating an image analyzer according to one or more embodiments used for detecting a range including and around a coarse candidate area.

The processing in steps S103 and S104 will now be described in detail with reference to FIG. 6. FIG. 6 is a schematic diagram of example processing performed in steps S103 and S104. As shown in FIG. 6, after detecting a coarse candidate area 311 in step S102, the control unit 11 defines a neighboring range 312 including and around the coarse candidate area 311. The neighboring range 312 includes the coarse candidate area 311, and extends from the coarse candidate area 311 by an appropriate number of pixels in at least a specific direction around the coarse candidate area 311. In the example shown in FIG. 6, the control unit 11 defines, as the neighboring range 312, the range extending from the coarse candidate area 311 by two pixels in every direction.

In steps S103 and S104, the control unit 11 precisely searches the defined neighboring range 312 for a face with a mask and a face without a mask. The search intervals in steps S103 and S104 shorter than the search intervals in step S102 may be determined depending on an embodiment. For example, the control unit 11 may search for a face with a mask and a face without a mask at intervals of one pixel.

A first area and a second area may be detected with any method selected as appropriate depending on an embodiment. For example, to detect the first and second areas, as in step S102, a known image processing method such as template matching may be used, or a discriminator constructed by machine learning, such as a neural network or self-organizing map, may be used. FIG. 6 shows an example method for detecting a first area and a second area by template matching. Specific operations may be similar to step S102. In other words, the control unit 11 may compare (or check) the template with (or against) an image in a predetermined range to detect the first and second areas. The range matching the template is to be detected as the first or second area. The control unit 11 may detect the first and second areas using a neural network.

In steps S103 and S104, to distinguish a face with a mask from a face without a mask, the control unit 11 detects the first and second areas with higher accuracy than in step S102. For example, in steps S103 and S104, instead of a template similar to that used in step S102, the control unit 11 may use image data including a face with a mask and image data including a face without a mask as templates for references for each set of image data. The control unit 11 can thus distinguish a first area likely to include a face without a mask from a second area likely to include a face with a mask to detect the areas with the processing in steps S103 and S104. After the detection of the first and second areas is complete, the control unit 11 advances the processing to step S105.

Step S105

Referring back to FIG. 4, in step S105, the control unit 11 functions as the determination unit 115 and determines whether a person in the captured image 31 obtained in the current process wears a mask on his or her face based on the detection results obtained in steps S103 and S104 and determination results obtained in the past process. In the first operation, no past determination results are available. In the first operation, the control unit 11 determines whether a person in the captured image 31 obtained in the current process wears a mask on his or her face based on the detection results obtained in steps S103 and S104 alone.

For example, the control unit 11 may determine whether a person wears a mask on his or her face in the obtained captured image 31 based on the reliability of the first and second areas. More specifically, the control unit 11 may determine that the person in the captured image 31 wears no mask on his or her face based on the first area having higher reliability than the second area. The control unit 11 may also determine that the person in the captured image 31 wears a mask on his or her face based on the second area having higher reliability than the first area. The control unit 11 may also detect a difficulty in determining whether the person in the captured image 31 wears a mask on his or her face based on the first area having equivalent reliability to the second area. In steps S103 and S104, to detect the first and second areas by pattern matching, the ratio of matching with a template may be used as the reliability. To detect the first and second areas with a neural network, a neural network trained to output the probability of the subject in the input area being a human face in response to an input of the first or second area may be additionally used. In this case, the probability output from the neural network may be used as the reliability.

For example, to detect the first and second areas by pattern matching in steps S103 and S104, multiple first areas or second areas may be detected around the area including a face without a mask or a face with a mask. Thus, the control unit 11 may determine whether a person wears a mask on his or her face in the obtained captured image 31 based on the number of detected first and second areas.

As one implementation of this determination method, the control unit 11 may determine that the person in the captured image 31 wears no mask on his or her face when more first areas are detected than second areas by a difference in number between the first areas detected in step S103 and the second areas detected in step S104 satisfying a predetermined condition. The control unit 11 may determine that the person in the captured image 31 wears a mask on his or her face when more second areas are detected than first areas by a difference in number between the first areas detected in step S103 and the second areas detected in step S104 satisfying a predetermined condition. The control unit 11 may detect a difficulty in determining whether the person in the captured image 31 wears a mask on his or her face when the difference in number between the first areas detected in step S103 and the second areas detected in step S104 does not satisfy the predetermined condition.

The determination as to whether the difference in number between the first areas detected in step S103 and the second areas detected in step S104 satisfies the predetermined condition may be performed using a predetermined threshold. More specifically, the control unit 11 may determine that the difference in number between the first areas and the second areas satisfies the predetermined condition when the difference is greater than or equal to the predetermined threshold. The control unit 11 may determine that the difference in number between the first areas and the second areas does not satisfy the predetermined condition when the difference falls below the predetermined threshold. In this case, the predetermined threshold may be determined as appropriate depending on an embodiment.

For example, when six first areas and one second area are detected and the predetermined threshold is 3, the control unit 11 determines that the person in the captured image 31 wears no mask on his or her face. When one first area and six second areas are detected, the control unit 11 determines that the person in the captured image 31 wears a mask on his or her face. When three first areas and four second areas are detected, the control unit 11 detects a difficulty in determining whether the person in the captured image 31 wears a mask on his or her face.

For convenience of explanation, the control unit 11 determines whether the difference in number between the first areas and the second areas satisfies the predetermined condition based on whether the difference is greater than or equal to the predetermined threshold in the manner as described above. In one or more embodiments, whether the difference in number between the first areas and the second areas satisfies the predetermined condition may be determined with any method. For example, the control unit 11 may determine whether the difference in number between the first areas and the second areas satisfies the predetermined condition based on the ratio of the number of first areas to the number of second areas. In this case, the threshold as a reference for determination as to whether the difference satisfies the predetermined condition may be set as appropriate for the ratio of the number of first areas to the number of second areas.

After determining whether a person wears a mask on his or her face in the obtained captured image 31 with the method described above, the control unit 11 advances the processing to step S106.

Step S106

In step S106, the control unit 11 selects one of the detection results obtained in steps S103 and S104 in accordance with the determination result obtained in step S105. The control unit 11 then locates the face area range including a human face based on the selected detection result.

In steps S103 and S104, multiple first areas and multiple second areas may be detected. When detecting multiple first areas in step S103 and determining that a person wears no mask on his or her face in step S105, the control unit 11 locates the face area range including a human face by joining the detected first areas. When detecting multiple second areas in step S104 and determining that a person wears a mask on his or her face in step S105, the control unit 11 locates the face area range including a human face by joining the detected second areas. When detecting, in step S105, a difficulty in determining whether the person wears a mask on his or her face, the control unit 11 locates the face area range including a human face by joining the first and second areas detected in steps S103 and S104.

Figure 7:
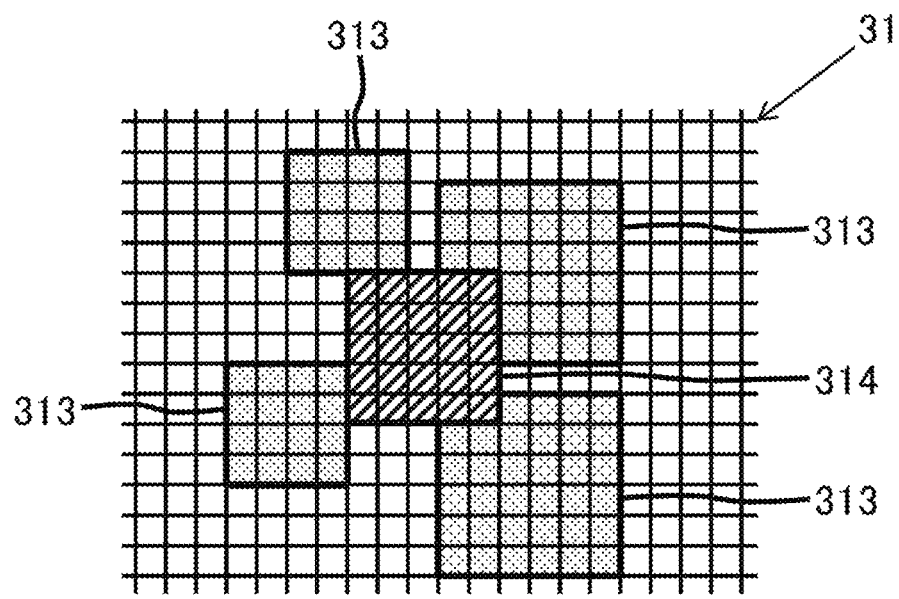
FIG. 7 is a schematic diagram illustrating an image analyzer according to one or more embodiments used for joining detection areas.

The processing for joining multiple areas in step S106 will now be described in detail with reference to FIG. 7. FIG. 7 schematically shows example processing for joining multiple areas in step S106. FIG. 7 shows the processing for locating the range of a face area 314 including a human face by joining multiple (four in FIG. 7) detected candidate areas 313.

When a person is determined to wear no mask on his or her face in step S105, the first area detected in step S103 is used as a candidate area 313. When a person is determined to wear a mask on his or her face in step S105, the second area detected in step S104 is used as a candidate area 313. When a difficulty is detected in determining whether the person wears a mask on his or her face in step S105, the first and second areas detected in steps S103 and S104 are used as candidate areas 313.

In the example shown in FIG. 7, the control unit 11 calculates the average center of gravity of the candidate areas 313, and determines the calculated average center of gravity as the center of gravity of the face area 314. The control unit 11 also calculates the average length of the sides of the candidate areas 313, and determines the calculated average length of the sides as the length of each side of the face area 314. Thus, the control unit 11 locates the range of a face area 314 including a human face by joining the multiple candidate areas 313.

Multiple areas may be joined with any method selected as appropriate depending on an embodiment. For example, instead of simply calculating the average center of gravity and the average length of the sides, the control unit 11 may assign a different weight to each candidate area 313 in accordance with the reliability of each candidate area 313. Thus, the face area 314 including a human face can be located accurately.

Step S107

Referring back to FIG. 4, in step S107, the control unit 11 functions as the error determination unit 117 and redetects a human face in the face area located in step S106 to determine whether the located face area has been detected erroneously.

More specifically, when determining that a person wears no mask on his or her face in step S105, the control unit 11 searches for a face without a mask in the face area. When determining that a person wears a mask on his or her face in step S105, the control unit 11 searches for a face with a mask in the face area. When detecting a difficulty in determining whether the person wears a mask on his or her face in step S105, the control unit 11 searches for a face with a mask and a face without a mask in the face area. A face with a mask and a face without a mask may be detected in a similar manner as in steps S103 and S104. After the detection of a human face is complete, the control unit 11 advances the processing to step S108.

Steps S108 and S109

In step S108, the control unit 11 determines whether a human face is detected in the face area through the processing in step S107. When a human face is detected in the face area through the processing in step S107, the control unit 11 skips the processing in S109 and advances to step S110. When no human face is detected in the face area through the processing in step S107, the control unit 11 performs the processing in step S109 and discards the detection result for the face area. For example, the control unit 11 determines the face area located in step S106 as an area including a subject other than a human face. After obtaining the detection result for the face area, the control unit 11 advances the processing to step S110.

Step S110

In step S110, the control unit 11 determines whether to end the image analysis for detecting an area including a human face in a captured image 31. When determining to end the image analysis for detecting a face area, the control unit 11 ends the processing associated with this operation. When determining to continue the image analysis for detecting a face area, the control unit 11 repeats the processing from step S101.

The conditions for ending the image analyses for detecting a face area may be determined as appropriate depending on an embodiment. For example, the control unit 11 may determine to end the image analyses for detecting a face area in response to an operator performing an operation to end the process.

Second or Subsequent Process

The control unit 11 basically performs the processing in steps S101 to S110 in the same manner as described above in the second or subsequent process of the image analyses for detecting a face area. In one or more embodiments, the control unit 11 uses the past process results described below through the processing in steps S102 and S105.

Step S102

In step S102, the control unit 11 detects a coarse candidate area in the range including and around the face area located in the previously obtained captured image 31. More specifically, in the image analysis in the second or subsequent process, the control unit 11 detects a coarse candidate area in a narrower range including and around the previously located face area.

Figure 8:
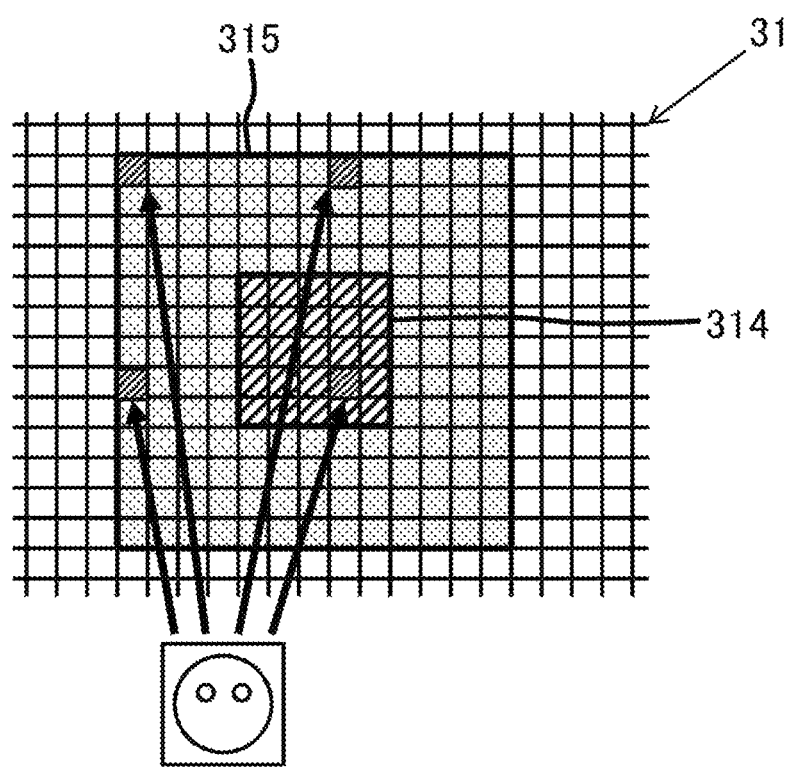
FIG. 8 is a schematic diagram illustrating an image analyzer according to one or more embodiments used for coarsely searching a range including and around a previously detected face area.

The processing in step S102 in the second or subsequent process of the image analyses for detecting a face area will now be described in detail with reference to FIG. 8. FIG. 8 schematically shows the processing in step S102 in the second or subsequent process of the image analyses for detecting a face area. As shown in FIG. 8, the control unit 11 defines a neighboring range 315 including and around the face area 314 located in the previously obtained captured image 31 based on the face area 314.

The neighboring range 315 includes the previously located face area 314, and extends from the face area 314 by an appropriate number of pixels in at least a specific direction around the previously located face area 314. The extended area may be determined in accordance with the range over which a human face is movable from the time point at which the past captured image 31 locating the face area 314 is obtained to the time point at which the captured image 31 is obtained in the current process. In the example shown in FIG. 8, the control unit 11 defines, as the neighboring range 315, the range extending from the previously located face area 314 by four pixels in every direction.

The control unit 11 coarsely searches the defined neighboring range 315 for an area including a human face in the same manner as described above. The previously obtained captured image may be a captured image obtained in the process immediately preceding the current process, a captured image obtained in the process a predetermined number of times preceding the current process, or the average of the captured images obtained in the processes from the immediately preceding process to the process the predetermined number of times preceding the current process.

Step S105

In step S105, as described above, the control unit 11 determines whether the person in the captured image 31 obtained in the current process wears a mask on his or her face based on the detection results obtained in steps S103 and S104 and the determination results for the past process. More specifically, in the image analysis in the second or subsequent process, the control unit 11 determines whether the person in the captured image 31 obtained in the current process wears a mask on his or her face based on the results of determination as to whether the person in the previously obtained captured image 31 wears a mask on his or her face.

The method for using the determination results obtained in the past process may be selected as appropriate depending on an embodiment. For example, the control unit 11 may determine that the person in the captured image 31 wears no mask on his or her face when more first areas are detected than second areas by a difference in number between the first areas detected in step S103 and the second areas detected in step S104 greater than or equal to a predetermined threshold. The control unit 11 may determine that the person in the captured image 31 wears a mask on his or her face when more second areas are detected than first areas by a difference in number between the first areas detected in step S103 and the second areas detected in step S104 greater than or equal to the predetermined threshold. The control unit 11 may determine whether the person in the captured image 31 obtained in the current process wears a mask on his or her face based on the determination results obtained in the past process by a difference in number between the first areas detected in step S103 and the second areas detected in step S104 falling below the predetermined threshold. The threshold used as a reference for each determination in the second or subsequent process may differ from the threshold used in the first determination process.

When the difference in number between the detected first and second areas falls below the predetermined threshold, the control unit 11 may retain the determination results obtained in the past process. More specifically, when the difference in number between the first and second areas detected in the current process falls below the predetermined threshold and when the control unit 11 determines that the person wears no mask on his or her face in the past process, the control unit 11 may determine that the person in the captured image 31 obtained in the current process wears no mask on his or her face. Similarly, when the difference in number between the first and second areas detected in the current process falls below the predetermined threshold and when the control unit 11 has determined that the person wears a mask on his or her face in the past process, the control unit 11 may determine that the person in the captured image 31 obtained in the current process wears a mask on his or her face.

When the difference in number between the detected first and second areas falls below the predetermined threshold, the control unit 11 may further determine each case as one of the cases classified below:

(a) the person in the previously obtained captured image 31 is determined to wear no mask, and more first areas are detected than second areas in the current process;

(b) the person in the previously obtained captured image 31 is determined to wear a mask, and more second areas are detected than first areas in the current process;

(c) the person in the previously obtained captured image 31 is determined to wear a mask, and more first areas are detected than second areas in the current process; and (d) the person in the previously obtained captured image 31 is determined to wear no mask, and more second areas are detected than first areas in the current process.

In cases (a) and (b), the control unit 11 may retain the determination results obtained in the past process. More specifically, in case (a), the control unit 11 may determine that the person in the captured image 31 obtained in the current process wears no mask on his or her face. In case (b), the control unit 11 may determine that the person in the captured image 31 obtained in the current process wears a mask on his or her face. In cases (c) and (d), the control unit 11 may detect a difficulty in determining whether the person in the captured image 31 obtained in the current process wears a mask on his or her face.

Operations and Effects

As described above, in the determination performed in step S105, the image analyzer 1 according to one or more embodiments uses the determination results obtained in the past process in addition to the individual detection results obtained in steps S103 and S104. The image analyzer 1 can thus determine whether a person wears a mask on his or her face based on the determination results obtained in the past process when detecting, for example, a difficulty in determining whether a person wears a mask on his or her face using the detected first and second areas. Additionally, the image analyzer 1 can evaluate the reliability of the detection results of the face in any situation based on, for example, whether the difference in number between the detected first and second areas agrees with the determination results obtained in the past process. The image analyzer 1 according to one or more embodiments thus improves the accuracy of determining whether a person wears a mask on his or her face.

The image analyzer 1 according to one or more embodiments coarsely searches for an area including a human face in step S102, and then precisely searches for a face with a mask and a face without a mask in steps S103 and S104. These searches eliminate precise searching of the entire captured image 31 and reduce the frequency of searching for a human face. The image analyzer 1 can thus reduce the computational complexity in the image analysis, thus reducing the computational load on the processor.

The image analyzer 1 according to one or more embodiments detects a coarse candidate area in a range including and around the face area located in the previously obtained captured image 31 in step S102 in the second or subsequent process. Thus, the image analyzer 1 can narrow the range of searching for a human face to the area determined to have high likelihood of including a human face. The image analyzer 1 according to one or more embodiments can thus reduce the computational complexity in the image analysis without greatly degrading the accuracy in detecting a human face, thus reducing the computational load on the processor.

The image analyzer 1 according to one or more embodiments redetects a human face in the face area located in step S106 in step S107 to determine whether the located face area has been detected erroneously. Thus, the image analyzer 1 according to one or more embodiments can avoid erroneous detection of a face area, and improves the reliability of image processing for detecting a human face in the captured image.

4. Modifications

One or more embodiments described in detail above are mere examples in all respects. One or more embodiments may be variously modified or altered without departing from the scope of the present invention. For example, one or more embodiments may be modified in the following forms. The same components as those in the above embodiments are hereafter given the same numerals, and the operations that are the same as those in the above embodiments will not be described. The modifications below may be combined as appropriate.

4.1

In one or more embodiments, a human face is an example of a subject to be detected, and a mask is an example of a cover for covering the subject. However, the subject and the cover is not limited to the above example, and may be selected as appropriate depending on an embodiment. For example, for a human face used as a subject to be detected as described above, the cover may be any object that covers the face, such as an eyepatch, sunglasses, a book, or a mobile phone, in addition to a mask.

In one or more embodiments, determination results obtained in the past process are used to determine whether a subject is covered by a cover. Thus, a cover remaining on or off the subject is to be used. A mask can remain on or off the face, and thus is suitable for the image analysis.

4.2

The image analysis method according to one or more embodiments involves coarse searching for an area including a human face in step S102 and precise searching for a face with a mask and a face without a mask in steps S103 and S104. However, the image analysis method according to one or more embodiments is not limited to the above example, and may eliminate step S102. The image analyzer 1 may eliminate the coarse detector 112 from its functional components.

4.3

The image analyzer 1 in one or more embodiments detects a coarse candidate area in the range including and around the face area located in the previously obtained captured image 31 in step S102 in the second or subsequent process. However, the image analysis method according to one or more embodiments is not limited to the above example, and may eliminate use of the past process results in step S102. When having difficulties in detecting a coarse candidate area in the neighboring range, the control unit 11 may repeatedly detect a coarse candidate area in a larger search range.

4.4

The image analysis method in one or more embodiments involves locating a face area by joining multiple candidate areas in step S106 when multiple candidate areas are detected in step S103 or S104. However, the image analysis method according to one or more embodiments is not limited to the above example. For example, the control unit 11 may select one candidate area from the multiple candidate areas detected in step S103 or S104, and designate the selected candidate area as a face area. The method for selecting a candidate area to be designated as a face area may be selected as appropriate depending on an embodiment. For example, the control unit 11 may select a most highly reliable one of the detected candidate areas as a face area. Steps S103 and S104 may be performed in the opposite order.

4.5

The image analysis method in one or more embodiments involves step S107 for redetecting a human face in a face area located in step S106 to determine whether the located face area has been detected erroneously. However, the image analysis method according to one or more embodiments is not limited to the above example, and may eliminate step S107. The image analyzer 1 may eliminate the error determination unit 117 from its functional components.

Appendix 1

An image analyzer, comprising:
a hardware processor; and
a memory storing a program executable by the hardware processor,
the hardware processor being configured to execute the program to implement
repeatedly obtaining a captured image including a subject to be detected;
detecting a first area likely to include the subject without a cover in the captured image;
detecting a second area likely to include the subject with a cover in the captured image;
determining whether the subject in the captured image is covered by the cover; and
selecting one of a detection result obtained in detecting the first area and a detection result obtained in detecting the second area in accordance with a determination result obtained in determining whether the subject is covered, and locating a subject area including the subject in the captured image based on the selected detection result,
wherein, in determining whether the subject is covered by the cover, the hardware processor determines whether the subject is covered by the cover based on the detection result obtained in detecting the first area and the detection result obtained in detecting the second area, and a determination result as to whether the subject in a previously obtained captured image is covered by the cover.

Appendix 2

An image analysis method, comprising:
repeatedly obtaining, with a hardware processor, a captured image including a subject to be detected;
detecting, with the hardware processor, a first area likely to include the subject without a cover in the captured image;
detecting, with the hardware processor, a second area likely to include the subject with a cover in the captured image;
determining, with the hardware processor, whether the subject in the captured image is covered by the cover; and
selecting, with the hardware processor, one of a detection result obtained in detecting the first area and a detection result obtained in detecting the second area in accordance with a determination result obtained in determining whether the subject is covered, and locating a subject area including the subject in the captured image based on the selected detection result,
wherein determining whether the subject is covered by the cover includes determining, with the hardware processor, whether the subject is covered by the cover based on the detection result obtained in detecting the first area and the detection result obtained in detecting the second area, and a determination result as to whether the subject in a previously obtained captured image is covered by the cover.

The invention claimed is:

1. An image analyzer comprising a processor configured with a program to perform operations comprising:
operation as an image obtaining unit configured to repeatedly obtain a captured image comprising a subject to be detected;
operation as a first detector configured to detect, in the captured image, a first area likely to comprise the subject without a cover;
operation as a second detector configured to detect, in the captured image, a second area likely to comprise the subject with a cover;
operation as a determination unit configured to determine whether the subject in the captured image is covered by the cover; and
operation as an area locating unit configured to select one of a detection result from operation as the first detector and a detection result from operation as the second detector in accordance with a determination result from operation as the determination unit, and to locate a subject area comprising the subject in the captured image based on the selected detection result, wherein
the processor is configured with the program to perform operations such that operation as the determination unit comprises:
determining whether the subject is covered by the cover based on: the detection result from operation as the first detector comprising at least the first area likely to comprise the subject without the cover; the detection result from operation as the second detector comprising at least the second area likely to comprise the subject with the cover; and a determination result as to whether the subject in a previously captured image is covered by the cover; and
in response to a difference between a number of first areas detected by the operation as the first detector and a number of second areas detected by operation as the second detector not satisfying a predetermined condition, detecting a difficulty in determining whether the subject is covered by the cover in response to the subject in the previously captured image being determined to be covered by the cover and to the number of detected first areas being greater than the number of detected second areas, or in response to the subject in the previously captured image being determined not to be covered by the cover and to the number of detected second areas being greater than the number of detected first areas.

2. The image analyzer according to claim 1, wherein
the processor is configured with the program to perform operations further comprising operation as a coarse detector configured to search the captured image at intervals larger than intervals at which operation as the first detector searches for the first area and intervals at which operation as the second detector searches for the second area, and detect a coarse candidate area likely to comprise the subject,
the processor is configured with the program to perform operations such that operation as the first detector comprises detecting the first area in a neighboring range in and around the coarse candidate area detected by operation as the coarse detector, and
the processor is configured with the program to perform operations such that operation as the second detector comprises detecting the second area in a neighboring range in and around the coarse candidate area detected by operation as the coarse detector.

3. The image analyzer according to claim 2, wherein
the processor is configured with the program to perform operations such that operation as the coarse detector comprises detecting the coarse candidate area in a neighboring range in and around the subject area located in the previously captured image.

4. The image analyzer according to claim 1, wherein the processor is configured with the program to perform operations such that:
operation as the determination unit comprises determining that the subject is not covered by the cover in response to detecting, by operation as the first detector, more first areas than second areas detected by operation as the second detector by a difference in number between the first areas and the second areas satisfying a predetermined condition,
operation as the determination unit comprises determining that the subject is covered by the cover in response to detecting, by operation as the second detector, more second areas than first areas detected by operation as the first detector by a difference in number between the first areas and the second areas satisfying the predetermined condition, and
operation as the determination unit comprises determining whether the subject is covered by the cover based on a result of determination as to whether the subject in the previously captured image is covered by the cover in response to the difference in number between first areas detected by operation as the first detector and second areas detected by operation as the second detector not satisfying the predetermined condition.

5. The image analyzer according to claim 1, wherein the processor is configured with the program to perform operations such that:
in response to detecting, by operation as the first detector, a plurality of first areas and to determining, by operation as the determination unit, that the subject is not covered by the cover, operation as the area locating unit comprises locating the subject area comprising the subject by joining the plurality of first areas, and in response to detecting, by operation as the second detector, a plurality of second areas and to determining, by operation as the determination unit, that the subject is covered by the cover, operation as the area locating unit comprises locating the subject area comprising the subject by joining the plurality of second areas.

6. The image analyzer according to claim 1, wherein the processor is configured with the program to perform operations such that:
in response to detecting, by operation as the determination unit, a difficulty in determining whether the subject is covered by the cover, operation as the area locating unit comprises locating the subject area comprising the subject by joining the first areas detected by operation as the first detector and the second areas detected by operation as the second detector.

7. The image analyzer according to claim 5, wherein the processor is configured with the program to perform operations further comprising:
operation as an error determination unit configured to redetect the subject in the located subject area to determine whether the located subject area has been detected erroneously.

8. The image analyzer according to claim 1, wherein
the subject to be detected comprises a human face.

9. The image analyzer according to claim 8, wherein
the cover comprises a mask.

10. The image analyzer according to claim 2, wherein the processor is configured with the program to perform operations such that:
operation as the determination unit comprises determining that the subject is not covered by the cover in response to detecting, by operation as the first detector, more first areas than second areas detected by operation as the second detector by a difference in number between the first areas and the second areas satisfying a predetermined condition,
operation as the determination unit comprises determining that the subject is covered by the cover in response to detecting, by operation as the second detector, more second areas than first areas detected by operation as the first detector by a difference in number between the first areas and the second areas satisfying the predetermined condition, and
operation as the determination unit comprises determining whether the subject is covered by the cover based on a result of determination as to whether the subject in a previously captured image is covered by the cover in response to the difference in number between first areas detected by operation as the first detector and second areas detected by operation as the second detector not satisfying the predetermined condition.

11. The image analyzer according to claim 2, wherein the processor is configured with the program to perform operations such that:
in response to detecting, by operation as the first detector, a plurality of first areas and to determining, by operation as the determination unit, that the subject is not covered by the cover, operation as the area locating unit comprises locating the subject area comprising the subject by joining the plurality of first areas, and
in response to detecting, by operation as the second detector, a plurality of second areas and to determining, by operation as the determination unit, that the subject is covered by the cover, operation as the area locating unit comprises locating the subject area comprising the subject by joining the plurality of second areas.

12. The image analyzer according to claim 2, wherein the processor is configured with the program to perform operations such that:

in response to detecting, by operation as the determination unit, a difficulty in determining whether the subject is covered by the cover, operation as the area locating unit comprises locating the subject area comprising the subject by joining the first areas detected by operation as the first detector and the second areas detected by operation as the second detector.

13. The image analyzer according to claim 6, wherein the processor is configured with the program to perform operations further comprising:

operation as an error determination unit configured to redetect the subject in the located subject area to determine whether the located subject area has been detected erroneously.

14. The image analyzer according to claim 2, wherein the subject to be detected comprises a human face.

15. The image analyzer according to claim 14, wherein the cover comprises a mask.

16. An image analysis method implemented by a computer, the method comprising:

repeatedly obtaining a captured image comprising a subject to be detected;

detecting, in the captured image, a first area likely to comprise the subject without a cover;

detecting, in the captured image, a second area likely to comprise the subject with a cover;

determining whether the subject in the captured image is covered by the cover; and selecting one of a detection result obtained in detecting the first area and a detection result obtained in detecting the second area in accordance with a determination result obtained in determining whether the subject is covered, and locating a subject area comprising the subject in the captured image based on the selected detection result, wherein determining whether the subject is covered by the cover comprises:

determining whether the subject is covered by the cover based on the detection result, comprising at least the first area, obtained in detecting the first area; and the detection result, comprising at least the second area, obtained in detecting the second area; and a determination result as to whether the subject in a previously captured image is covered by the cover; and in response to a difference between a number of detected first areas and a number of detected second areas not satisfying a predetermined condition, detecting a difficulty in determining whether the subject is covered by the cover in response to the subject in the previously captured image being determined to be covered by the cover and to the number of detected first areas being greater than the number of detected second areas, or in response to the subject in the previously captured image being determined not to be covered by the cover and to the number of detected second areas being greater than the number of detected first areas.

17. A non-transitory computer-readable storage medium storing an image analysis program, which when read and executed, causes a computer to perform operations comprising:

repeatedly obtaining a captured image comprising a subject to be detected;

detecting, in the captured image, a first area likely to comprise the subject without a cover;

detecting, in the captured image, a second area likely to comprise the subject with a cover;

determining whether the subject in the captured image is covered by the cover; and selecting one of a detection result obtained in detecting the first area and a detection result obtained in detecting the second area in accordance with a determination result obtained in determining whether the subject is covered, and locating a subject area comprising the subject in the captured image based on the selected detection result, wherein determining whether the subject is covered by the cover comprises:

determining whether the subject is covered by the cover based on: the detection result, comprising at least the first area, obtained in detecting the first area; the detection result, comprising at least the second area, obtained in detecting the second area; and a determination result as to whether the subject in a previously captured image is covered by the cover; and in response to a difference between a number of detected first areas and a number of detected second areas not satisfying a predetermined condition, detecting a difficulty in determining whether the subject is covered by the cover in response to the subject in the previously captured image being determined to be covered by the cover and to the number of detected first areas being greater than the number of detected second areas, or in response to the subject in the previously captured image being determined not to be covered by the cover and to the number of detected second areas being greater than the number of detected first areas.

* * * * *